Patented Nov. 12, 1940

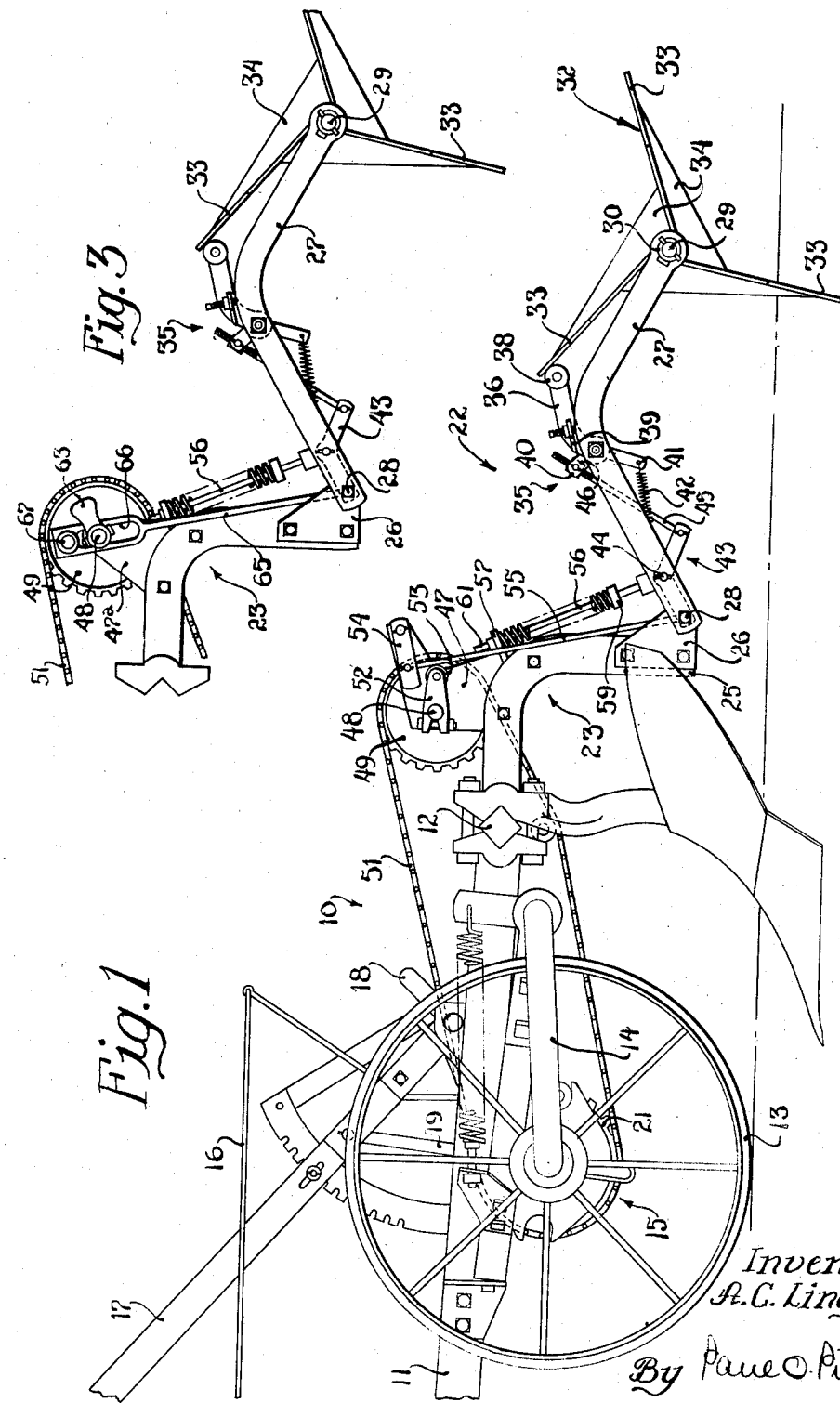

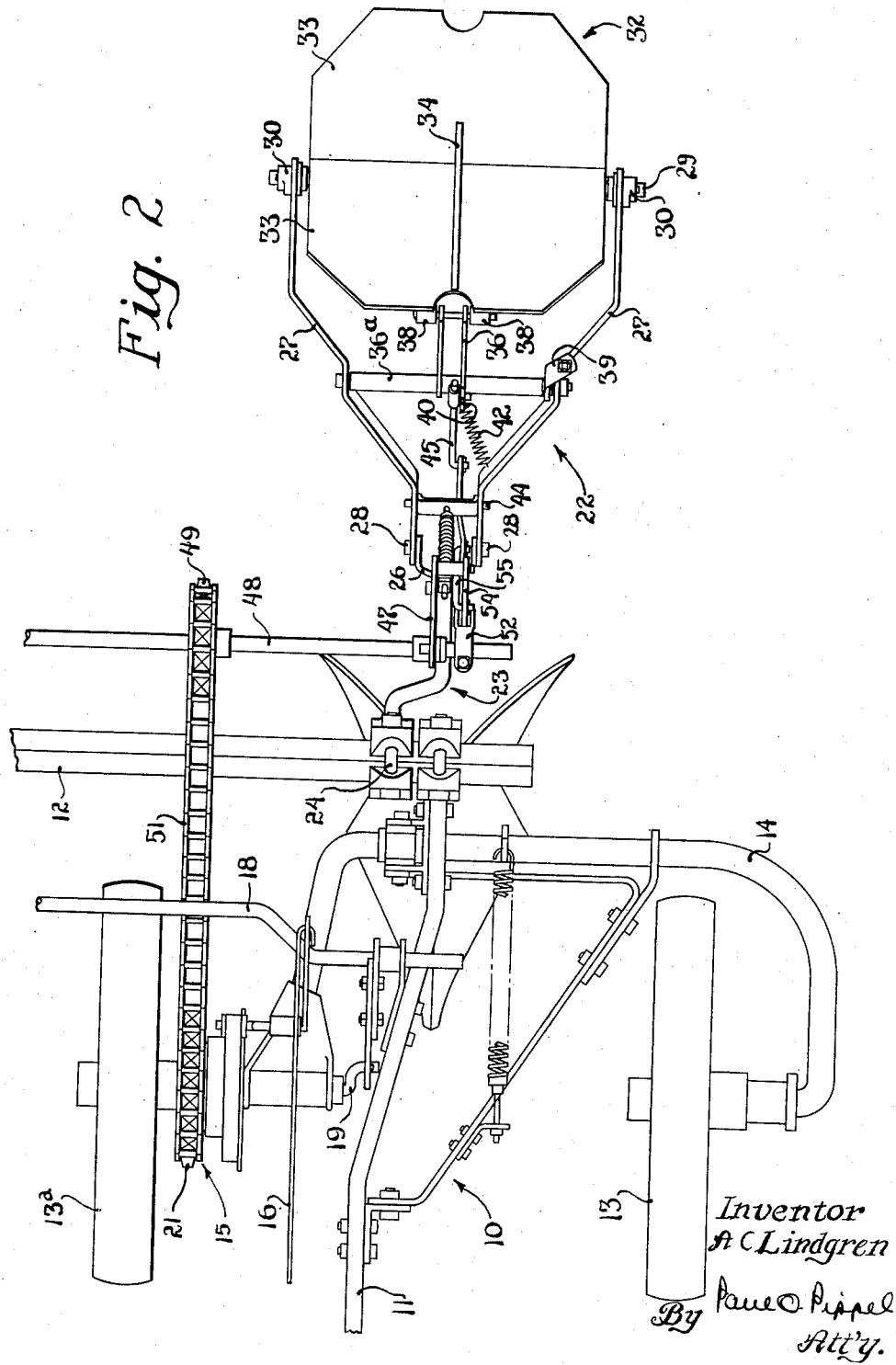

2,221,550

UNITED STATES PATENT OFFICE 2,221,550

ROLL-OVER TYPE DAMMER

Alexus C. Lindgren, Chicago, Ill., assignor to International Harvester Company, a corporation of New Jersey Application December 29, 1939, Serial No. 311,609

20 Claims. (Cl. 97—55)

This invention relates to a roll-over type dammer attachment for implements. More specifically the present invention relates to a roll-over type dammer attachment that can readily be attached to any implement.

It is desirable in roll-over type dammer attachments pivotally to connect the attachment to the implement at a point near to the ground. By this type of mounting, the line of draft of the dammer attachment is such that the blades will stay in the ground and not have a tendency to move upwardly and skid over the ground. In this way it is also possible to construct the attachment much lighter in weight, since the weight of the attachment is not necessary to insure its proper penetration in the soil.

It is, therefore, the object of the present invention to provide a mounting for a dammer attachment that will improve the operation thereof.

Another object of the invention is to provide a trip mechanism for the dammer attachment which will not operate as the attachment follows the contour of the ground.

Another object of the invention is to provide a dammer attachment that can be readily attached to any type of implement.

According to the present invention, there is provided a roll-over type dammer attachment that can be attached to the implement as a unit. Each unit is provided with a bracket which is connected to the implement. These brackets have a downwardly depending portion to which is pivoted an arcuate frame that has a revolvable blade means journalled at the end thereof. A trip mechanism is provided on the arcuate frame. A driven shaft also journaled in the brackets has a series of cams secured thereon. An arm pivoted on the brackets coperates with the cams provided on the shaft. A link is connected to the arm and to the trip mechanism of the dammer attachment at a point near to the same pivot axis of the arcuate frame pivotal connection to the bracket. A biasing means is provided between the arcuate frame and the bracket for holding the dammer attachment in a soil-working position.

Other objects and advantages will become apparent in the detailed description to follow, wherein:

Figure 1 is a side view of the improved dammer attachment attached to an implement, only a portion of which is shown;

Figure 2 is a plan view of the device shown in Figure 1; and,

Figure 3 is a side view of a modified form of the cam arrangement for operating the tripping mechanism.

As shown in Figure 1, there is provided a lister 10 which comprises a frame 11 and a transverse tool-bar 12. The frame 11 is supported on wheels 13 and 13a by means of an axle 14. The wheel 13a has associated therewith the usual power-lift 15 provided to raise and lower the implement frame 11. The power-lift 15 is controlled by a rope 16.

A lever 17 is mounted on the frame 11 and is connected with a transverse shaft 18 journaled on the frame 11. The shaft 18 is connected to the power-lift mechanism 15 by a link 19. By moving the lever 17 the shaft 18 is rotated and the link connection 19 to the power-lift adjusts the machine to effect different depths of operation. A sprocket 21 is secured to the wheel 13, the purpose of which will be described later on.

The tool bar 12 of the lister 10 has several laterally spaced dammer attachments secured thereon; however, the showing has been limited to one dammer attachment. Most generally the attachments are arranged to follow the furrow openers provided on the tool bar 10.

The dammer attachment indicated by the numeral 22 includes an attaching bracket 23 which has an upset end secured on the tool-bar 12 by bolts 24. The bracket 23 has a downwardly extending portion 25 at the end of which is bolted a pair of plates 26. The plates 26 have threaded alined openings therein. An upwardly arched arcuate frame 27 including two forwardly converging side members is pivoted on the plates 26 by means of threaded studs 28. The frame 27 extends rearwardly and is provided with alined openings at the rear end thereof. A shaft 29 is journaled in bearings 30 provided in said openings.

On the shaft 29 there is mounted for rotation a revolvable blade means 32, which comprises a series of blades 33. These blades 33 have their inner ends welded together so as to form a box-like structure to form a bearing therefor which is journaled on the shaft 29. A series of reenforcing plates 34 are welded between the blades 33.

A trip mechanism 35 is provided on the frame 27. This mechanism comprises a bell-crank 36 which is secured to a sleeve 36a that is pivoted on a shaft 37 supported on the side members of the frame 27. At one end of the bell-crank 36 are mounted rollers 38 positioned to cooperate with the blades 33. The bell-crank also has a stop portion 39 overlying one of the side members of the frame 27 which has an adjustable means thereon so that the rollers can be adjusted with respect to the blade 33. Said stop portion also limits the movement of the bell-crank 36 in a clockwise direction. The bell-crank 36 also has an arm portion 40 and an arm 41. The arm 41 is connected to the frame member 27 by a spring 42 operating to hold the adjustable means on the portion 39 against the frame 27.

Another bell-crank 43 pivoted on a rod 44 is secured between the arcuate members of the frame 27. A rod 45 connected to one end of the bell-crank 43 is adjustably connected to the portion 40 of the bell-crank 36. This adjustable connection comprises a threaded part 46 which is pivoted on the arm 40. The end of the rod 45 is threaded and turned into the threaded part 46. In this way the movement of the bell-crank 36 can be increased or decreased.

On the bracket 23 is provided a plate 47 in which is rotatably mounted a shaft 48. A sprocket 49 is secured on the shaft 48, and a chain 51 is trained over the sprocket 49 and the sprocket 21 on the wheel 13a. As the wheel 13a rotates over the ground, the chain 51 transmits movement to the shaft 48. An arm 52 is secured on the shaft 48. Said arm has a roller 53 mounted at the end thereof. A part or arm 54 pivoted on the plate 47 overhangs the roller 53 on the arm 52. As the wheel 13a moves over the ground the shaft 48 is rotated and the arms 52 on the shaft 48 are moved in a counter-clockwise direction. As shown in Figure 1, the rotation of the arm 52, will on each revolution thereof contact the part 54 and move it about its pivotal connection to the bracket 47. A rod 55 is connected to the part 54 and to the other end of the bell-crank 43 previously described. The connection of the rod 55 to the bell-crank 43 is substantially in axial alinement with the pivotal connection of the frame 27 to the bracket 23 when the dammer is in soil-collecting position. By this construction the dammer attachment 22 can pivot about its pivotal connection to the bracket 23 and the trip mechanism 35 will not be operated.

In Figure 3 is shown a modified form of the cam arrangement for operating the tripping mechanism 35. In this case, the shaft 48 has a cam 63 secured thereon. The shaft is journaled in a plate 47a provided on the bracket 23. A rod 65 having a slot 66 at one end thereof encircles the shaft 48. A roller 67 is also mounted at this end of the rod 65. The other end of said rod is connected to the bell-crank 43 on substantially the same pivot axis of the pivotal connection of the frame 27 to the plates 26 of the bracket 23 when the dammer is in a soil-collecting position.

The shaft 48 is driven from the ground wheel 13a through the chain 51. As the shaft is driven the cam 63 will intermittently contact the roller 67 and move the rod 65 upwardly and actuate the tripping mechanism 35.

A biasing means is provided between the frame 27 and the bracket 23. This biasing means includes a rod 56 pivotally connected to the rod 44 on the frame members 27. A part 57 secured on the bracket 23 has an opening provided therein in which is inserted the rod 56; one end of the spring contacts the part 57, and an adjustable collar 59 contacts the other end of the spring. The tension of the spring holds the dammer attachment in the ground. An adjustable collar 61 is also provided on the rod 56 and contacts the part 57. By this arrangement, the machine can be adjusted to its different positions and the dammer attachment will be adjusted simultaneously therewith.

From the foregoing description it will be apparent that a novel arrangement has been provided in dammer attachments. The units can be secured to any type machine. The mounting of the units is such that the dammers will operate efficiently under all conditions. A trip mechanism has been provided that will permit the blades of the dammer to follow the contour of the ground and which will not operate until actuated by the machine. The dammer is inexpensive to manufacture and is easily adaptable to various types of machines.

While various changes may be made in the detailed construction and in the arrangement of the various parts, it should be understood that certain changes shall be within the spirit and scope of the invention as defined in the appended claims.

What is claimed is:

1. In combination, a frame, ground means for supporting said frame, a bracket secured to the frame, a rotatable shaft carried by the bracket, a roll-over type dammer attachment trailingly and pivotally connected to said bracket for vertical movement including a revolvable blade means and a trip mechanism for releasing the blade means to permit revolving of the same, a cam on said rotatable shaft, a part pivoted on the bracket and adapted to be moved by said cam, and a rod connected to said part and with said trip mechanism on the same pivot axis as the pivotal connection of the dammer attachment to the bracket, when the dammer attachment is in a soil-collecting position.

2. In combination, a roll-over type dammer attachment adapted to be connected to an implement comprising a bracket having a portion adapted to be connected to the implement and a downwardly extending portion, a roll-over type dammer attachment trailingly and pivotally connected to the downwardly extending portion for vertical movement including a revolvable blade means and a trip mechanism for releasing the blade means to permit revolving of the blade, a shaft carried by said bracket, means for rotating said shaft, a cam on said shaft, an arm pivoted on the bracket and adapted to contact said cam, and means connecting said arm to said tripping mechanism at a point near to the pivotal connection of the dammer attachment to said downwardly extending portion of said bracket.

3. A dammer attachment adapted to be connected to an implement comprising a bracket having a downwardly depending portion, means for securing the bracket to an implement, a dammer frame pivoted on said downwardly depending portion of the bracket and extending rearwardly of said bracket, a series of dammer blades pivoted on the dammer frame, trip mechanism mounted on said frame for releasing the blades, a shaft carried by said bracket, means for driving said shaft, a cam on said shaft, an arm pivoted on said bracket and cooperating with said cam, and means connecting said arm with said tripping mechanism at a point near the pivotal connection of the frame to the downwardly depending portion of the bracket to prevent tripping of the blades during operation thereof over uneven ground.

4. In combination, a frame, ground means for supporting said frame, a bracket secured to the frame, a rotatable shaft carried by the bracket, a roll-over type dammer attachment trailingly and pivotally connected to said bracket for vertical movement including a revolvable blade means and a trip mechanism for releasing the blade means to permit revolving of the same, a cam on said rotatable shaft, a part pivoted on the bracket and adapted to be moved by said cam, and a rod connected to said part and with said trip mechanism at a point concentric with the pivotal connection of the dammer attachment to the bracket when said dammer is in a soil-collecting position and biasing means on the dammer attachment acting against the bracket for holding said attachment in a ground-working position.

5. In combination, a roll-over type dammer attachment adapted to be connected to an implement comprising a bracket having a portion adapted to be connected to the implement and a downwardly extending portion, a roll-over type dammer attachment trailingly and pivotally connected to the downwardly extending portion for vertical movement including a revolvable blade means and a trip mechanism for releasing the blade means to permit revolving of the blade, spring biasing means disposed between the dammer attachment and said bracket for holding said attachment in the ground, a shaft carried by said bracket, means for rotating said shaft, a cam on said shaft, an arm pivoted on the bracket and adapted to contact said cam, and means connecting said arm and with said tripping mechanism at a point near to the pivotal connection of the dammer attachment to said downwardly extending portion of said bracket.

6. A dammer attachment adapted to be connected to an implement by brackets, said brackets comprising a downwardly extending portion, a roll-over type dammer attachment trailingly and pivotally connected to said downwardly extending portion for vertical movement including a revolvable blade means and a trip mechanism for releasing the blade means to permit revolving of the same, a shaft journaled in said brackets, means for driving said shaft, cam means on said shaft, and means on said bracket adapted to contact said cam means connected to said tripping mechanism on said attachment at a point near to the pivotal connection of the attachment to the downwardly extending portion of said bracket.

7. In combination, a frame, ground means for supporting said frame, brackets having downwardly extending portions secured to said frame, a rotatable shaft carried by said brackets, means for rotating the shaft, a series of cams on said shaft, a pair of spaced frame members pivoted on the downwardly extending portion of said bracket and extending rearwardly thereof, blade means pivoted on the rearwardly extending portions of said frame members, a shaft secured between said frame members, an arm pivoted on said shaft, rollers mounted on the end of said arm and contacting said blades, a bell-crank pivotally mounted between said frame members, a rod connected to one end of said bell-crank and to said bracket and movable by said cam, and a rod connected to said member and to the other end of the bell-crank at a point near the pivotal connection of the frame members to the brackets.

8. In combination, an implement frame, wheel means for supporting the frame, ground-working tools on the frame, a dammer means pivotally connected to the frame at a point below said frame, said dammer comprising a pair of rearwardly extending frame members, a revolvable blade means including a plurality of blade portions with their inner ends arranged to form a box-like structure journaled between the ends of the rearwardly extending frame members, a bell-crank pivoted on said frame members, a pair of rollers mounted at one end of the bell-crank and contacting one of the blade portions, a second bell-crank pivoted on the frame members, an adjustable rod connected to one end of the first bell-crank and one end of the second bell-crank, a shaft journaled on said frame, means for driving said shaft, cam means on said shaft, a member pivoted on said frame and cooperating with said cam means, and a rod connected to said member and to the other end of the second bell-crank at a point near the pivotal connection of the dammer frame to the implement frame.

9. In combination, an implement frame, wheel means for supporting the frame, ground-working tools on the frame, a dammer means pivotally connected to the frame at a point below said frame, said dammer comprising a pair of rearwardly extending frame members, a revolvable blade means including a plurality of blade portions with their inner ends arranged to form a box-like structure journaled between the ends of the rearwardly extending frame members, a bell-crank pivoted on said frame members, a pair of rollers mounted at one end of the bell-crank and contacting one of the blade portions, means for limiting the movement of said bell-crank in one direction, a second bell-crank pivoted on the frame members, an adjustable rod connected to one end of the first bell-crank and one end of the second bell-crank, a shaft journaled on said frame, means for driving said shaft, cam means on said shaft, a member pivoted on said frame and cooperating with said cam means, and a rod connected to said member and to the other end of the second bell-crank at a point near the pivotal connection of the dammer frame to the implement frame.

10. In combination, an implement frame, wheel means for supporting the frame, ground-working tools on the frame, a dammer means pivotally connected to the frame at a point below said frame, said dammer comprising a pair of rearwardly extending frame members, a revolvable blade means including a plurality of blade portions with their inner ends arranged to form a box-like structure journaled between the ends of the rearwardly extending frame members, biasing means connected to the dammer frame and to the implement frame for holding the dammer frame in the ground, a bell-crank pivoted on said frame members, a pair of rollers mounted at one end of the bell-crank and contacting one of the blade portions, a second bell-crank pivoted on the frame members, an adjustable rod connected to one end of the first bell-crank and one end of the second bell-crank, a shaft journaled on said frame, means for driving said shaft, cam means on said shaft, a member pivoted on said frame and cooperating with said cam means, and a rod connected to said member and to the other end of the second bell-crank at a point near the pivotal connection of the dammer frame to the implement frame.

11. In combination, an implement frame, wheel means for supporting the frame, ground-working tools on the frame, a dammer means pivotally connected to the frame at a point below said frame, said dammer comprising a pair of rearwardly extending frame members, a revolvable blade means including a plurality of blade portions with their inner ends arranged to form a box-like structure journaled between the ends of the rearwardly extending frame members, biasing means connected to the dammer frame and to the implement frame for holding the dammer frame in the ground, a bell-crank pivoted on said frame members, a pair of rollers mounted at one end of the bell-crank and contacting one of the blade portions, means for limiting the movement of said bell-crank in one direction, a second bell-crank pivoted on the frame members, an adjustable rod connected to one end of the first bell-crank and one end of the second bell-crank, a shaft journaled on said frame, means for driving said shaft, cam means on said shaft, a member pivoted on said frame and cooperating with said cam means, and a rod connected to said member and to the other end of the second bell-crank at a point near the pivotal connection of the dammer frame to the implement frame.

12. In combination, an implement frame, wheel means for supporting the frame, ground-working tools on the frame, a dammer means pivotally connected to the frame at a point below said frame, said dammer comprising a pair of rearwardly extending frame members, a revolvable blade means including a plurality of blade portions with their inner ends arranged to form a box-like structure journaled between the ends of the rearwardly arcuate extending frame members, a bell-crank pivoted on said frame members, a pair of rollers mounted at one end of the bell-crank and contacting one of the blade portions, a second bell-crank pivoted on the frame members, an adjustable rod connected to one end of the first bell-crank and one end of the second bell-crank, a shaft journaled on said frame, means for driving said shaft, cam means on said shaft, a member pivoted on said frame and cooperating with said cam means, and a rod connected to said member and to the other end of the second bell-crank at a point near the pivotal connection of the dammer frame to the implement frame.

13. In combination, a frame, ground means for supporting said frame, a rotatable shaft carried by the frame, a cam on said shaft, a roll-over type dammer attachment trailingly and pivotally connected to said frame for vertical movement including a revolvable blade means and a trip mechanism to permit revolving of the same, and means operatively associated with said cam and connected to said tripping mechanism on the same pivot axis as the pivotal connection of the dammer to the frame when the tripping mechanism is at rest.

14. In combination, a frame, ground means for supporting said frame, a rotatable shaft carried by the frame, cams on the shaft, roll-over type dammer attachments adapted to be pivotally connected to the frame, trip means provided on each of said dammer attachments, and means operatively associated with said cams and connected to said trip means at a point close to the pivotal connection of said attachments to said frame.

15. In combination, a wheel supported frame, a rotatable shaft carried by the frame, a cam provided on the shaft, a revolvable blade dammer attachment pivotally connected to the frame, a blade tripping mechanism provided on the attachment, and means operatively associated with the cam on said shaft and connected to the tripping mechanism at the same pivot axis as the pivotal connection of the attachment to the frame.

16. In combination, a wheel supported frame, a rotatable shaft carried by the frame, a cam provided on the shaft, a revolvable blade dammer attachment pivotally connected to the frame, a blade tripping mechanism provided on the attachment, means operatively associated with the cam on said shaft and connected to the tripping mechanism at the same pivot axis as the pivotal connection of the attachment to the frame, and biasing means disposed between the attachment and the frame to maintain the same in its ground-working position.

17. In combination, a wheeled implement frame, a bracket having a downwardly extending portion secured to the frame, a roll-over type dammer attachment trailingly and pivotally connected to the downwardly extending portion of said bracket for vertical movement including a revolvable blade means and a trip mechanism for releasing the blade means to permit revolving of the same, a rotatable shaft carried by the frame, a cam on the rotatable shaft, a member having an opening at one end thereon encircling the shaft, a roller mounted at the slotted end of the member and operatively associated with said cam, and the other end of said member connected to the trip mechanism on substantially the same pivot axis as the pivotal connection of the dammer attachment to the downwardly extending portion of said bracket.

18. In combination, a wheeled implement frame, a bracket secured to the frame, a roll-over type dammer attachment trailingly and pivotally connected to said bracket for vertical movement including a revolvable blade means and a trip mechanism for releasing the blade means to permit revolving of the same, a rotatable shaft carried by the frame, a cam on the rotatable shaft, a member having an opening at one end thereof encircling the shaft, a roller mounted at the end of the member and operatively associated with said cam, and the other end of said member connected to the trip mechanism at substantially the same pivot axis as the pivotal connection of the dammer attachment to the bracket.

19. In combination, a wheeled frame, a rotatable shaft on said frame, a cam on said shaft, a dammer attachment comprising two pivotally connected members, the first member adapted to be secured to said frame, a revolvable blade means associated with the second member, a trip mechanism associated with the revolvable blade means, and means operatively associated with said cam and connected to said trip mechanism on the same pivot axis of the pivotal connection of the two members in such a manner that the dammer attachment will follow the contour of the ground and the trip mechanism will not be operated by the movement of said second member about its pivotal connection to the first member.

20. In combination, a frame, ground means for supporting said frame, brackets having downwardly extending portions secured to the frame, a rotatable shaft carried by said brackets, cams on said shaft, roll-over type dammer attachments trailingly and pivotally connected to said downwardly extending portion of the brackets for vertical movement, each attachment including a revolvable blade means and a trip mechanism for releasing the blade means to permit revolving of the same, rods having slots at one end thereof encircling the shaft and operatively associated with said cams, and the other end of said rods connected to said tripping mechanisms on the same pivot axis as the pivotal connection of the attachments to the downwardly extending portions of said brackets.

ALEXUS C. LINDGREN.